Feb. 28, 1956   R. B. TROUSDALE   2,736,860
TESTER
Filed April 9, 1952
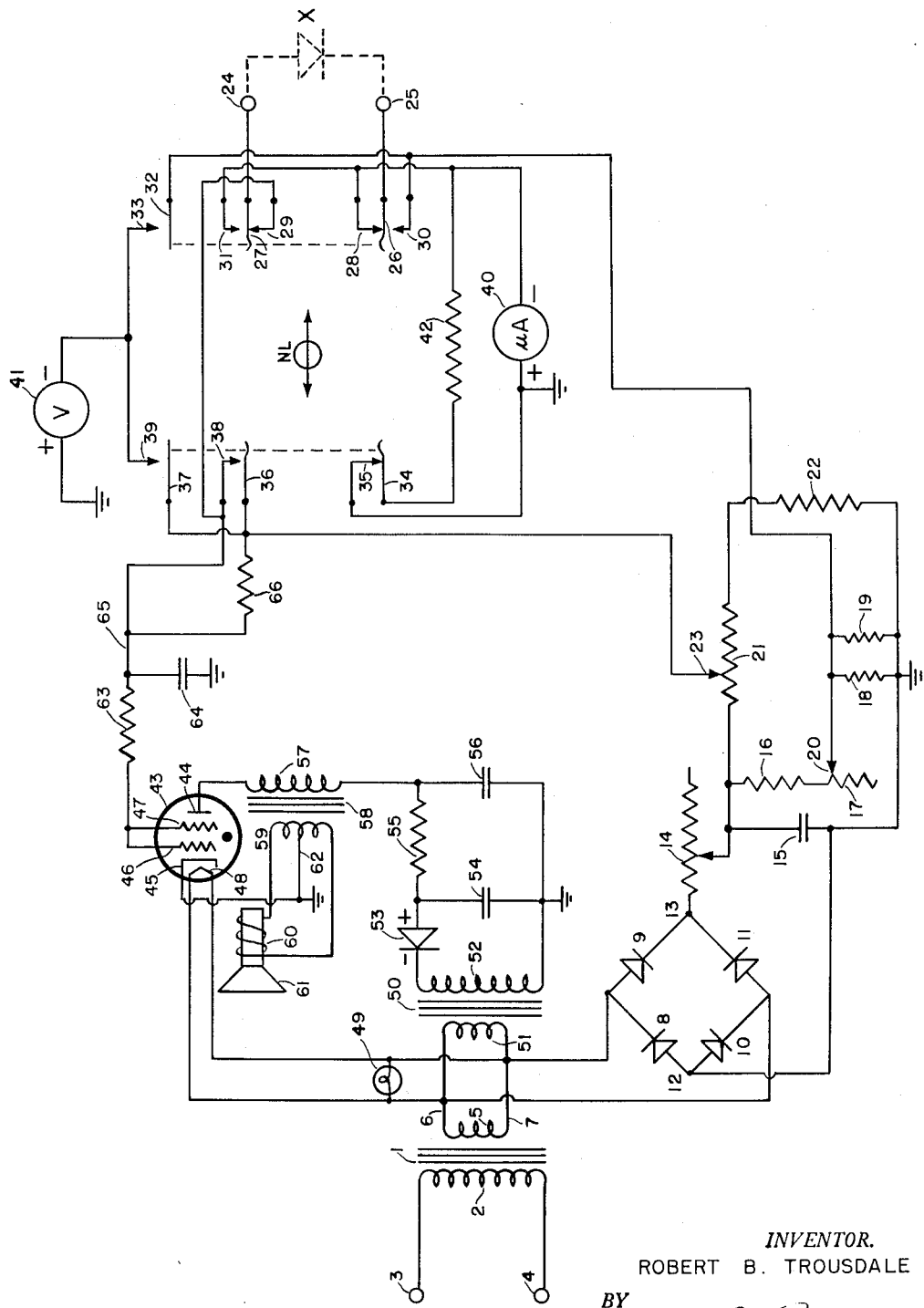
INVENTOR.
ROBERT B. TROUSDALE
BY
*T. L. Bowes*
ATTORNEY United States Patent Office 2,736,860
Patented Feb. 28, 1956

2,736,860
TESTER

Robert B. Trousdale, Rochester, N. Y., assignor, by mesne assignments, to General Dynamics Corporation, a corporation of Delaware Application April 9, 1952, Serial No. 281,331

13 Claims. (Cl. 324—57)

My invention relates to means for testing electrical components, and more particularly to means for testing diodes. My invention finds particular application in testing crystal diodes of the germanium type.

It is well known that diodes exhibit the property of greater conduction in one direction than in the other. The direction of greater conductivity is known as the forward direction while that of lower conductivity is known as the reverse, or back, direction. The ratio of conductivities, or its inverse (that is, the ratio of the forward to the reverse resistance) is a measure of the effectiveness of the diode.

To determine the forward and reverse conductivities, it has been the practice before my invention to apply a standard potential across the diode in such polarity as to produce the forward-acting current and to measure the magnitude of this current. Next a standard potential of opposite polarity is applied to the diode and the resulting current again measured.

In the case of germanium diodes, it has been standard practice to apply one volt to the crystal for the forward test and three volts for the reverse test. The resulting current flow in the latter case is small, and requires a microammeter to read it. When the forward voltage is applied, it may be necessary to shunt the microammeter.

Microammeters are sensitive instruments and therefore expensive. If the diode to be tested were connected to the test circuit in a polarity opposite to that expected, and the larger test potential were applied, the indicating needle of the microammeter might be driven off scale and seriously damaged. This would also be true if the diode to be tested were short circuited or had a very low value of back resistance.

Prior to my invention, it was necessary to protect the microammeter by first placing the diode in a circuit with an appreciably large shunt across the meter. After making sure that the needle would not be driven off scale, the operator of the testing apparatus could remove the shunt and then obtain an accurate reading of the conduction current through the diode. This procedure was obviously time consuming and subject to human error.

It is accordingly an object of my invention to provide a testing apparatus for diodes which may be more rapid in operation than those known heretofore.

It is also an object of my invention to provide a diode tester which gives positive indication if the diode is incorrectly connected to the testing apparatus or if the diode is defective and consequently has a low value of back resistance.

It is still another object of my invention to provide a diode tester which is less subject to human error in operation than other testers known heretofore by reason of giving an immediate audible warning signal if the particular diode to be tested is defective or is connected in incorrect polarity.

It is yet another object of my invention to provide a diode tester which automatically gives audible warning if a particular diode being tested is connected to the apparatus in incorrect polarity or is defective and consequently presents less than a predetermined value of resistance, yet which requires few parts and is simple to construct.

Further objects and advantages of my invention will become apparent as the following description proceeds, and the features of novelty which characterize my invention will be pointed out with particularity in the claims annexed to and forming a part of this specification.

For a better understanding of my invention, reference may be had to the accompanying drawing which shows a schematic circuit diagram of my invention.

Referring now to the drawing, there is shown a transformer 1 whose primary 2 is connected to terminals 3 and 4. Terminals 3 and 4 may be supplied with alternating current from any convenient source, such as a conventional wall outlet fed from a central energy station. Such a source of energy is well known, and therefore is not shown in the drawing. Secondary 5 of transformer 1 supplies low voltage alternating current; for example, if primary 2 is supplied with the conventional potential of 115 volts, secondary 5 may have an output potential of 6.3 volts. Connected to the leads 6 and 7 of secondary 5 is a rectifier which may be of any conventional type but which I have chosen to illustrate as of the bridge type employing rectifiers 8, 9, 10 and 11. The positive potential output terminal 12 of this bridge rectifier is connected to ground, while the output of the negative potential terminal 13 is passed through a low-pass filter comprising series resistor 14 and shunt capacitor 15. Resistor 14 is made variable in order that the output voltage may be adjusted.

The output of the low-pass filter (resistor 14 and capacitor 15) is split into a first and a second branch. The first branch includes the voltage divider formed by the series combination of resistors 16, 17 and 18, the latter shunted by resistor 19. The voltage derived from the movable arm 20 of resistor 17 comprises a source of standard test potential for forward conductivity testing. The second branch comprises resistors 21 and 22 in series. The voltage derived from tap 23 of resistor 21 furnishes a standard test potential for testing reverse conductivity.

The particular diode to be tested by these standard test potentials is connected between terminals 24 and 25. This diode is indicated schematically in the drawing by dashed lines and is identified by the symbol X.

Since the diode to be tested by the standard test potentials must have these test potentials applied in sequence, switching means for establishing a first and a second measuring circuit must be provided. I have chosen to illustrate my invention as employing a switch of the telephone cam-lever, or key, type. This switch is illustrated in the accompanying drawing in the conventional symbolic form for such switches, the letters NL standing for "non-locking." This cam of this type of switch may be moved to either side of center (right or left, as viewed in the drawing), but is returned to the center position when finger pressure on its key lever is removed.

When the cam of the switch is moved to the right (as viewed in the drawing), center contact springs 26 and 27 are moved out of contact with springs 28 and 29, respectively, and into contact with springs 30 and 31, respectively. Furthermore, contact is made between springs 32 and 33. When the cam of the switch is moved to the left as viewed in the drawing, spring 34 is moved out of contact with spring 35, and springs 36 and 37 are moved into contact with springs 38 and 39, respectively.

Moving the switch cam to the left establishes a first circuit which applies potential from tap 23 on resistor 21 across the series combination of the diode to be tested (connected to terminals 24 and 25) and microammeter 40. This circuit is employed to measure the reverse conductivity of the diode under test and may be traced as follows: tap 23, contacts 36 and 38, contact springs 29 and 27, terminal 24, diode to be tested, terminal 25, contact springs 26 and 28, microammeter 40, and ground. In addition, the potential derived from tap 23 is connected to a voltmeter 41 by way of contact springs 37 and 39. The voltmeter is useful in adjusting tap 23 on resistor 21, and also, as may be seen later, in adjusting tap 20 on resistor 17.

Moving the switch cam to the right establishes a second circuit for applying a standard test potential to the diode under test and measuring the forward conductivity. The circuit thus established may be traced from tap 20 on resistor 17, contact springs 30 and 26, terminal 25, diode to be tested, terminal 24, contact springs 27 and 31, microammeter 40, and ground. In this case, voltmeter 41 is connected to the voltage supplied from tap 20 by way of contact springs 32 and 33. When the switch cam is in the right-hand position, microammeter 40 is shunted by resistor 42 by way of contact springs 34 and 35.

Those skilled in the art to which my invention appertains can readily appreciate that the use of a telephone key switch of the type diagrammed is a convenient, but not a necessary, way of switching between the first and second circuits for measuring the forward and reverse currents of the diode.

As pointed out previously, my invention provides a warning signal for the operator to forestall meter damage if the diode to be tested is defective or incorrectly connected. To furnish this warning signal, I provide a discharge device 43, preferably of the gaseous type, having at least an anode 44, a cathode 45, and a control element 46. I have illustrated discharge device 43 as having a second control element 47 which is tied to control element 46. The cathode 45 of tube 43 is caused to emit electrons by reason of the connection of heater 48 to secondary leads 6 and 7 of transformer 1. I may provide a pilot lamp 49 also connected to leads 6 and 7 to provide a convenient means for indicating when the tester is in operation.

Further in accordance with my invention, I may provide a power supply including a transformer 50 whose primary 51 is supplied with voltage from terminals 6 and 7 of transformer 1. I may further choose transformer 50 to be the electrical equivalent of transformer 1 but with primary and secondary positions reversed. In this case, secondary 52 will yield the same voltage as fed into primary 2 of transformer 1. The voltage of secondary 52 may be rectified by rectifier 53 and filtered by capacitor 54. Those skilled in the art can appreciate that some other source of potential or other power supply circuit configuration might be substituted for the power supply shown here.

Connected to the output of this power supply is a circuit including series resistor 55, shunt capacitor 56, the primary winding 57 of the transformer 58, and the anode 44 of discharge device 43. The secondary 59 of transformer 58 is connected to the voice coil 60 of a sound transducer 61 which I have illustrated as being of the conventional loudspeaker type. Center tap 62 of secondary 59 of transformer 58 may be grounded as indicated, if desired.

Resistor 55 and capacitor 56 comprise the frequency-determining portion of a relaxation oscillator circuit which includes discharge device 43. Resistor 55 has a value sufficiently large to prevent a sustained flow of current through resistor 55, primary 57, and the space current path of discharge device 43. As is well known to those skilled in the art, a relaxation oscillator oscillates at a frequency determined by the values of the plate resistor and capacitor, these components being resistor 55 and capacitor 56, respectively, in the present case.

The non-sinusoidal anode current waveform is coupled through primary 57 of transformer 58 to transducer 61. Transducer 61 consequently emits a clearly audible warning signal having a fundamental frequency equal to the relaxation rate. The warning signal has many harmonics because of the non-sinusoidal current flow in primary 57 of transformer 58.

I control the relaxation of the discharge device 43 by the potential applied to control electrodes 46 and 47. I apply this potential through the circuit including resistor 63, shunt capacitor 64 and conductor 65. Conductor 65 is connected directly to contact springs 38 and 29 of the switch, and through resistor 66 to movable arm 23 of the resistor 21.

The apparatus is placed in operation by connecting terminals 3 and 4 to a suitable source of potential. Operating potential is then built up across capacitor 54, and the two testing voltages are built up at the two resistor terminals 20 and 23. After a few moments, discharge device 43 warms up, and the instrument is ready for use.

I prefer that the particular tube chosen for discharge device 43 be one wherein complete cutoff is obtained by the application of approximately —2 volts to the control electrodes 46 and 47 thereof. The tube designated commercially as a type 5696 thyratron has this characteristic. In the absence of modifying factors, discharge device 43 is cut off by the negative three-volt testing voltage on control electrodes 46 and 47. This voltage is applied from arm 23 of resistor 21 through resistors 66 and 63 to control electrodes 46 and 47.

After this instrument has warmed up, a particular diode to be tested (indicated at X in the drawing) is connected between terminals 24 and 25. With the key switch in its unactuated center position, diode X acts as a shunting resistance from the junction of resistors 63 and 66 to ground. The negative bias potential applied to the control electrodes 46 and 47 of the discharge device 43 is consequently reduced. The shunting circuit can be traced from ground, microammeter 40 and shunt 42, contacts 28 and 26, terminal 25, diode X under test, terminal 24, contacts 27 and 29, and conductor 65 to the junction of resistors 63 and 66.

The resistance presented by the diode under test is a function of the polarity of the voltage applied thereto and also of the quality of the diode itself. If the diode is so connected that its back resistance is presented to the above described circuit, the bias reduction on the control electrodes is determined by the ratio between the resistance of resistor 66 and the back resistance of the diode under test. With diodes of inferior quality, the back resistance presented is relatively low, and the bias reduction is great. In accordance with my invention, I proportion the value of resistor 66 to achieve a degree of bias reduction which permits discharge device 43 to oscillate if the diode back resistance is less than a predetermined minimum value. I prefer that this minimum value of resistance be one which would cause full scale deflection of microammeter 40 if the cam of the key switch were moved to the left.

From the foregoing, it may be seen that discharge device 43 will oscillate and give an audible warning signal, by way of the transducer 61, whenever a diode connected to terminals 24 and 25 has a back resistance below the predetermined minimum value. Capacitor 64 and resistor 63 from the low-pass filter between control electrodes 46 and 47 of discharge device 43 and the biasing network including resistor 66 and conductor 65. This filter prevents the application of control electrode current, varying at the oscillatory rate of discharge device 43, to the diode under test.

Suppose that the diode to be tested has not been connected to terminals 24 and 25 in the correct polarity. ("Correct" refers to the connection of a diode X such that its cathode is connected to terminal 25 and its anode is connected to terminal 24.) Then the applied voltage causes diode X to exhibit its low forward resistance. This low resistance is shunted across the biasing network for discharge device 43, thereby reducing the bias almost to zero. Relaxation oscillations therefore occur, the audible warning signal is transmitted by the transducer 61, and the operator is immediately apprized of the incorrect connection of diode X to terminals 24 and 25, before he has had an opportunity to move the key switch to either right or left and hence to endanger microammeter 40.

The same operation occurs if the diode is short circuited or so defective as to have a low value of back resistance. If the person operating the testing apparatus hears the warning tone created by relaxation oscillations, he is unaware whether the warning tone is due to a reversed connection of the diode or to a defective diode. To ascertain which is the case, he reverses the polarity of the diode under test relative to terminals 24 and 25. If the warning tone resulted only from incorrect connection to terminals 24 and 25, the warning tone does not recur when the polarity is reversed. In the absence of warning tone, the operator is informed that the switch may be thrown either to left or to right to measure diode conductivity without danger of harming microammeter 40. On the other hand, if the warning tone reoccurs when the diode polarity is reversed, the operator is made aware that the switch should not be touched and that the diode should be discarded as defective.

To test the diode, after it has been determined that it has been properly connected to terminals 24 and 25 and that it exhibits greater than the minimum value of back resistance, the lever of the switch is moved to the left and the position of tap 23 on resistor 21 may be adjusted until the voltmeter reads the desired reverse test voltage. Once adjusted, tap 23 will seldom require attention when testing a group of diodes. In the case of germanium crystal diodes, the voltage is conventionally set to three volts. The microammeter reading is noted at this time, and an indication of the back resistance of the diode is therefore obtained.

Next the switch lever is thrown to the right and the position of tap 20 on resistor 17 is adjusted to produce the desired forward test potential, usually 1 volt in the case of germanium diodes. Again, tap 20 will seldom require readjustment once set. The new reading of microammeter 40 as shunted by resistor 42 is noted to determine the value of forward resistance.

From the foregoing description, it is apparent that a diode tester constructed according to my invention enables diode testing to proceed at a rapid rate without danger of damaging the delicate measuring equipment essential to this work. Furthermore, the operator is instantly informed by the warning signal, preferably of the unmistakable audible type shown, whenever a diode is connected to the testing apparatus in the incorrect polarity. He therefore need not waste time shunting the microammeter by pressing buttons or throwing switches, but may reverse the polarity relative to the test terminals without hesitation.

While I have shown and described my invention as applied to a specific embodiment thereof, other modifications will readily occur to those skilled in the art. For example, a relay capable of closing a warning lamp circuit might be substituted for transformer 58. I do not, therefore, desire my invention to be limited to the specific arrangement shown and described, and I intend in the appended claims to cover all modifications within the spirit and scope of my invention.

What I claim is:

1. In a diode tester, the combination of signal means operative to furnish a warning if a particular diode to be tested is connected to said tester is incorrect polarity; signal means operative to furnish a warning if said particular diode has less than a predetermined value of back resistance; means for measuring the forward current of said particular diode under a test potential; and means for measuring the back current of said particular diode under a test potential.

2. The combination of claim 1 in which said warning is immediately effective upon connection of said particular diode to said tester.

3. The combination of claim 1 in which said signal means produces an audible signal.

4. In a diode tester, the combination of a first circuit for measuring the forward current of a diode under test potential; a second circuit for measuring the reverse current of a diode under test potential; means for connecting a particular diode to be tested to either of said first and second circuits at will, said means including terminals for accepting the leads from said particular diode under test; and means for giving a warning signal when said particular diode is connected to said terminals in incorrect polarity.

5. In a diode tester, the combination of a first circuit for measuring the forward current of a diode under test potential; a second circuit for measuring the reverse current of a diode under test potential; means for connecting a particular diode to be tested to either of said first and second circuits at will, said means including terminals for accepting the leads from said particular diode under test; and means for giving a warning signal when said particular diode has less than a predetermined minimum value of back resistance but is connected to said terminals in correct polarity.

6. The combination of claim 5 in which said warning means is operative immediately upon connection of said particular diode to said terminals.

7. In an electrical component tester, the combination of terminals for connecting a particular component to be tested to said tester; a warning circuit having an oscillator portion and a control portion, said terminals being connected to said control portion; bias means connected to said control portion effective to cut off said oscillator portion at times other than when said particular component connected to said terminals has less than a predetermined minimum value of resistance; and means for translating said oscillations of said oscillating portion into a warning signal.

8. In an electrical component tester, the combination of terminals for connecting a patricular component to be tested to said tester; a warning circuit having an oscillator portion and a control portion for said oscillator portion, said terminals being connected to said control portion; a source of bias potential; said source and said oscillator and control portions each having a ground return; impedance means connected between said source of bias potential and said control portion, the potential applied from said source to said control portion being sufficient to cut off said oscillator portion, one of said terminals being connected to a point between said impedance means and said control portion and another of said terminals being effectively connected to a ground return; and means for translating said oscillations of said oscillator means into a warning signal whereby said particular component acts as a shunt to decrease the magnitude of said bias potential being applied through said impedance means to said control portion, said shunting action being sufficient to cause said oscillator portion to generate oscillations translatable by said translating means into said warning signal.

9. In an electrical component tester, the combination of terminals for connecting a particular component to be tested to said tester; a warning circuit having an oscillator portion and a control portion for said oscillator portion, said terminals being connected to said control portion; a source of bias potential; said source and said oscillator and control portions each having a ground return; resistance means connected between said source of bias potential and said control portion, the potential applied from said source to said control portion being sufficient to cut off said oscillator portion, one of said terminals being connected to a point between said resistance means and said control portion and another of said terminals being effectively connected to a ground return; and means for translating said oscillations of said oscillator means into a warning signal whereby said particular component acts as a shunt to decrease the magnitude of said bias potential being applied through said resistance means to said control portion, said shunting action being sufficient to cause said oscillator portion to generate oscillations translatable by said translating means into said warning signal.

10. In an electrical component tester, the combination of terminals for connecting a particular component to be tested to said tester; an oscillator circuit including a gaseous discharge device having at least an anode, a cathode, and a control electrode; means for causing said cathode to emit electrons; a source of unidirectional potential; indicating means connected in series with said source of potential, said series combination of said source of potential and said indicating means being connected between said anode and said cathode; a source of bias potential; impedance means; said source of bias potential and said impedance means being connected in series between said control electrode and said cathode; one of said terminals being effectively connected from the junction of said impedance means and said control electrode, and another of said terminals being effectively connected to said cathode, whereby said particular component acts to shunt the bias potential being applied to said control electrode.

11. In an electrical component tester, the combination of terminals for connecting a particular component to be tested to said tester; an oscillator circuit including a gaseous discharge device having at least an anode, a cathode, and a control electrode; means for causing said cathode to emit electrons; a source of unidirectional potential; indicating means connected in series with said source of potential, said series combination of said source of potential and said indicating means being connected between said anode and said cathode; a source of bias potential; resistance means; said source of bias potential and said resistance means being connected in series between said control electrode and said cathode; one of said terminals being effectively connected from the junction of said resistance means and said control electrode, and another of said terminals being effectively connected to said cathode, whereby said particular component acts to shunt the bias potential being applied to said control electrode.

12. In an electrical component tester, the combination of terminals for connecting a particular component to be tested to said tester; an oscillator circuit including a gaseous discharge device having at least an anode, a cathode, and a control electrode; means for causing said cathode to emit electrons; a source of unidirectional potential; a sound transducer circuit connected in series with said source of potential, said series combination of said source of potential and said sound transducer circuit being connected between said anode and said cathode; a source of bias potential; impedance means; said source of bias potential and said impedance means being connected in series between said control electrode and said cathode; one of said terminals being effectively connected from the junction of said impedance means and said control electrode, and another of said terminals being effectively connected to said cathode, whereby said particular component acts to shunt the bias potential being applied to said control electrode.

13. In an electrical component tester, the combination of terminals for connecting a particular component to be tested to said tester; an oscillator circuit including a gaseous discharge device having at least an anode, a cathode, and a control electrode; means for causing said cathode to emit electrons; a source of unidirectional potential; a sound transducer circuit connected in series with said source of potential, said series combination of said source of potential and said sound transducer circuit being connected between said anode and said cathode; a source of bias potential; resistance means; said source of bias potential and said resistance means being connected in series between said control electrode and said cathode; one of said terminals being effectively connected from the junction of said resistance means and said control electrode, and another of said terminals being effectively connected to said cathode, whereby said particular component acts to shunt the bias potential being applied to said control electrode.

References Cited in the file of this patent

UNITED STATES PATENTS

| 1,824,802 | Brehman | Sept. 29, 1931 |
| 2,104,441 | Stratford | Jan. 4, 1938 |
| 2,231,035 | Stevens et al. | Feb. 11, 1941 |
| 2,271,292 | Fisher | Jan. 27, 1942 |
| 2,509,027 | Zimmermann | May 23, 1950 |

OTHER REFERENCES

Schwanhausser; Article entitled "Testing selenium rectifier cells" in General Electric Review, for November 1944; pages 53, 54, 55.